(12) United States Patent
Deng et al.

(10) Patent No.: US 11,565,457 B2
(45) Date of Patent: Jan. 31, 2023

(54) ELECTRICAL HEATING MOLD

(71) Applicant: GUANGZHOU TECH-LONG PACKAGING MACHINERY CO., LTD, Guangzhou (CN)

(72) Inventors: Wenzhou Deng, Guangzhou (CN); Xiaolin Huang, Guangzhou (CN)

(73) Assignee: GUANGZHOU TECH-LONG PACKAGING MACHINERY CO., LTD, Guangdong (CN)

( * ) Notice: Subject to any disclaimer, the term of this patent is extended or adjusted under 35 U.S.C. 154(b) by 0 days.

(21) Appl. No.: 17/421,448

(22) PCT Filed: Mar. 27, 2020

(86) PCT No.: PCT/CN2020/081550
§ 371 (c)(1),
(2) Date: Jul. 8, 2021

(87) PCT Pub. No.: WO2020/253303
PCT Pub. Date: Dec. 24, 2020

(65) Prior Publication Data
US 2022/0080648 A1    Mar. 17, 2022

(30) Foreign Application Priority Data
Jun. 20, 2019    (CN) .......................... 201910536929.9

(51) Int. Cl.
*B29C 49/48*    (2006.01)
*B29L 31/00*    (2006.01)

(52) U.S. Cl.
CPC .. *B29C 49/4823* (2013.01); *B29C 2049/4846* (2013.01); *B29C 2049/4889* (2013.01); *B29L 2031/7158* (2013.01)

(58) Field of Classification Search
CPC ........ B29C 49/4823; B29C 2049/4846; B29C 2049/4889
See application file for complete search history.

(56) References Cited

U.S. PATENT DOCUMENTS

| 4,233,022 A | 11/1980 | Brady et al. |
| 5,411,698 A | 5/1995 | Mero et al. |

(Continued)

FOREIGN PATENT DOCUMENTS

| CN | 2111179 | 7/1992 |
| CN | 202862466 | 4/2013 |

(Continued)

OTHER PUBLICATIONS

International Search Report of PCT/CN2020/081550 dated May 9, 2020.

(Continued)

*Primary Examiner* — Robert B Davis
(74) *Attorney, Agent, or Firm* — Woodard, Emhardt, Henry, Reeves & Wagner, LLP

(57) ABSTRACT

Provided is an electrical heating mold. The electrical heating mold includes a mold casing and an electrical heating device disposed in the mold casing. The electrical heating device includes an upper annular heating resistor element group configured to perform heating around a bottleneck, a middle annular vertical-inserted columnar heating resistor element group configured to perform heating around a bottle body, and a lower annular heating resistor element group configured to perform heating around a bottle bottom. The electrical heating mold has a good heating effect, a low processing cost and a simple structure.

4 Claims, 7 Drawing Sheets

(56) References Cited

U.S. PATENT DOCUMENTS

| | | | |
|---|---|---|---|
| 7,775,786 B2* | 8/2010 | Zoppas | B29C 33/305 |
| | | | 425/526 |
| 2008/0220114 A1 | 9/2008 | Lefebure et al. | |
| 2014/0377394 A1* | 12/2014 | Le Pechour | B29C 49/38 |
| | | | 425/526 |
| 2018/0104885 A1* | 4/2018 | Alix | B29C 49/786 |

FOREIGN PATENT DOCUMENTS

| | | | | |
|---|---|---|---|---|
| CN | 109397668 | | 3/2019 | |
| CN | 208867548 | | 5/2019 | |
| EP | 1 753 597 | | 5/2008 | |
| EP | 2307185 | | 8/2014 | |
| GB | 1480647 A | * | 7/1977 | ............ B29C 49/16 |
| GN | 110126240 | | 8/2019 | |
| JP | H03-042632 U | | 4/1991 | |
| JP | 2017124571 | | 7/2017 | |

OTHER PUBLICATIONS

Extended European Search Report in related EP20826431.7 dated Jun. 27, 2022.
Office Action in related JP2021-541709 dated Jun. 29, 2022.

* cited by examiner

ELECTRICAL HEATING MOLD

This is a national stage application filed under 37 U.S.C. 371 based on International Patent Application No. PCT/CN2020/081550, filed Mar. 27, 2020, which claims priority to Chinese Patent Application No. 201910536929.9 filed Jun. 20, 2019, the disclosures of which are incorporated herein by reference in their entireties.

TECHNICAL FIELD

The present disclosure relates to the field of bottle blowing manufacture, in particular, a bottle blowing mold having an electrical heating device.

BACKGROUND

A bottle parison needs to be placed in an electrical heating mold so as to be blown into a container bottle, and heating is required during the blowing process so that the bottle parison can be better stretched to form the container bottle. Currently, there are two kinds of electrical heating molds used in the industry. One is to heat a cavity wall of the mold through preheating fluid (such as water or oil). Since a relatively large heat exchange between the cavity wall and the container bottle is required, more preheating fluid is required and thus the preheating fluid needs to have a large reserve. Secondly, since the preheating fluid needs to flow to transfer heat, a flow channel needs to be provided in the mold, and the structure of the flow channel is complex, thus increasing the manufacturing difficulty and manufacturing cost of the mold. The other is to heat the cavity wall of the mold through a resistor. European Patent EP1753597 describes that the resistor is arranged at an interface between a mold casing and a bottom mold. During heating, the heat is dissipated from bottom to top, resulting in poor heating effect of the bottom of the container bottle, which affects the molding quality. Secondly, the resistor has a shape of a coil. Setting the resistor on the bottom mold requires complex processing of the bottom mold, and the processing is difficult and high in cost.

SUMMARY

The present disclosure aims to provide an electrical heating mold with good heating effect, a low processing cost and a simple structure.

The electrical heating mold provided by the present disclosure includes a mold casing and an electrical heating device disposed in the mold casing. The electrical heating device includes an upper annular heating resistor element group configured to perform heating around a bottleneck, a middle annular vertical-inserted columnar heating resistor element group configured to perform heating around a bottle body, and a lower annular heating resistor element group configured to perform heating around a bottle bottom.

In the electrical heating mold provided by the present disclosure, the electrical heating device includes the upper annular heating resistor element group configured to perform heating around the bottleneck, the middle annular vertical-inserted columnar heating resistor element group configured to perform heating around the bottle body, and the lower annular heating resistor element group configured to perform heating around the bottle bottom. Since the bottleneck has a small diameter, when the middle annular vertical-inserted columnar heating resistor element group performs heating on the bottle body, the heat, generated by the middle annular vertical-inserted columnar heating resistor element group, radiated to the bottleneck is reduced, so that a heating temperature at the bottleneck is insufficient. Therefore, the upper annular heating resistor element group is arranged at the bottleneck to perform heating around the bottleneck (a surrounding diameter of the upper annular heating resistor element group may be adjusted according to diameters of bottlenecks of different container bottles). In this manner, the heating temperature at the bottleneck can be ensured and the heating temperature at the bottleneck is more uniform, thus ensuring the blowing quality at the bottleneck. For the bottle bottom, since the bottle bottom is disposed on a bottom mold, the bottom mold is made of metal material, and the heat is dissipated from bottom to top when the middle annular vertical-inserted columnar heating resistor element group performs heating, the heat energy at the bottle bottom is quickly dissipated. In order to ensure the blowing quality of the bottle bottom, the lower annular heating resistor element group is arranged to perform heating around the bottle bottom so as to ensure a heating temperature at the bottle bottom. In this manner, the heating temperature at the bottle bottom is uniform, and the blowing quality at the bottle bottom is guaranteed. Heating resistor element groups with different structures are provided for different positions of the container bottle so that optimal usage of heat energy can be achieved, and meanwhile the structure of the mold is simplified and the processing cost is saved. In addition, for container bottles of different shapes, surrounding diameters and height positions of the upper annular heating resistor element group and the lower annular heating resistor element group, and a length of the middle vertical-inserted columnar heating resistor element group may further be adjusted so that the electrical heating mold adapts to container bottles of more shapes and has a wider application range.

DETAILED DESCRIPTION

Figure 1:
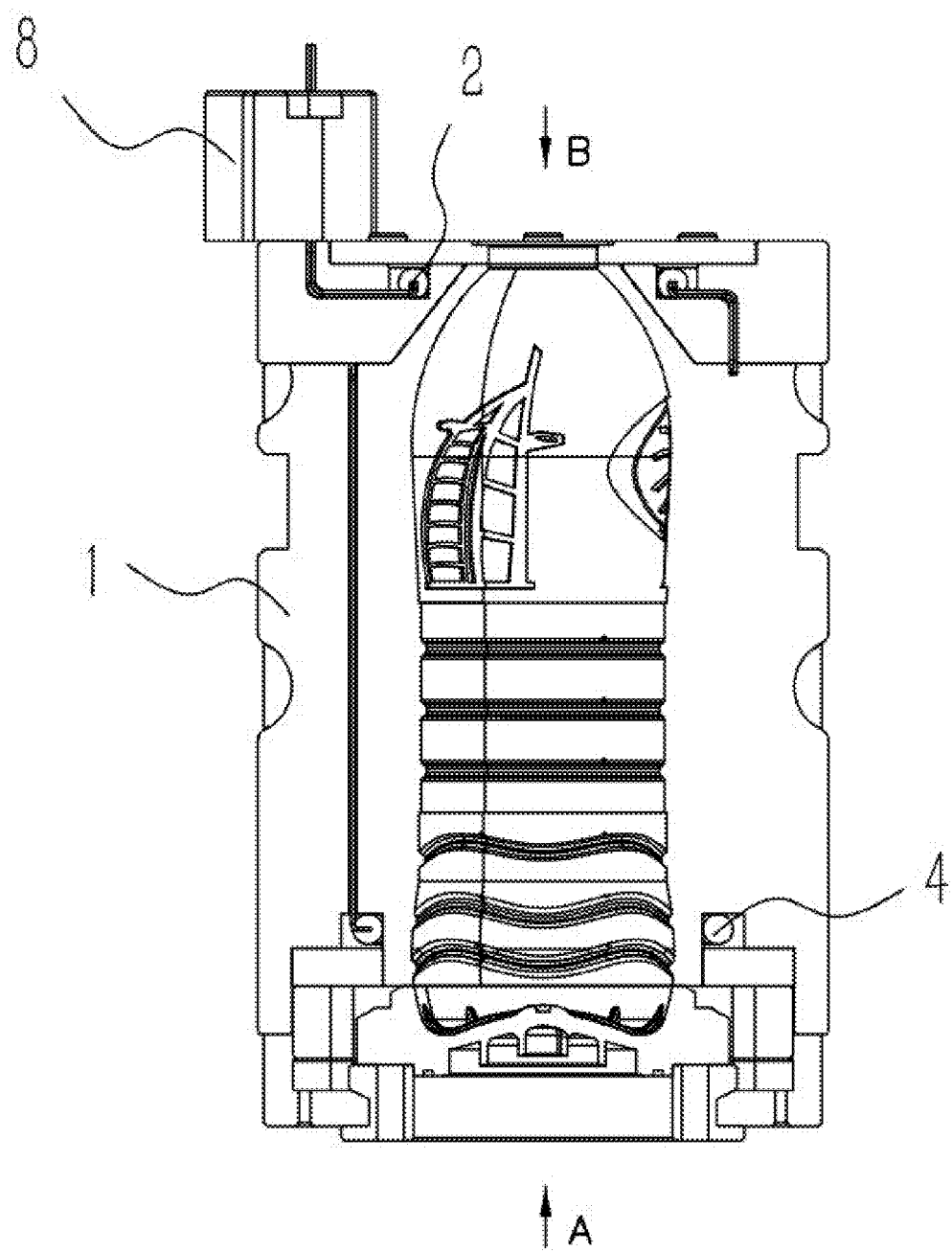
FIG. 1 is a structure view according to the present disclosure.
Figure 2:
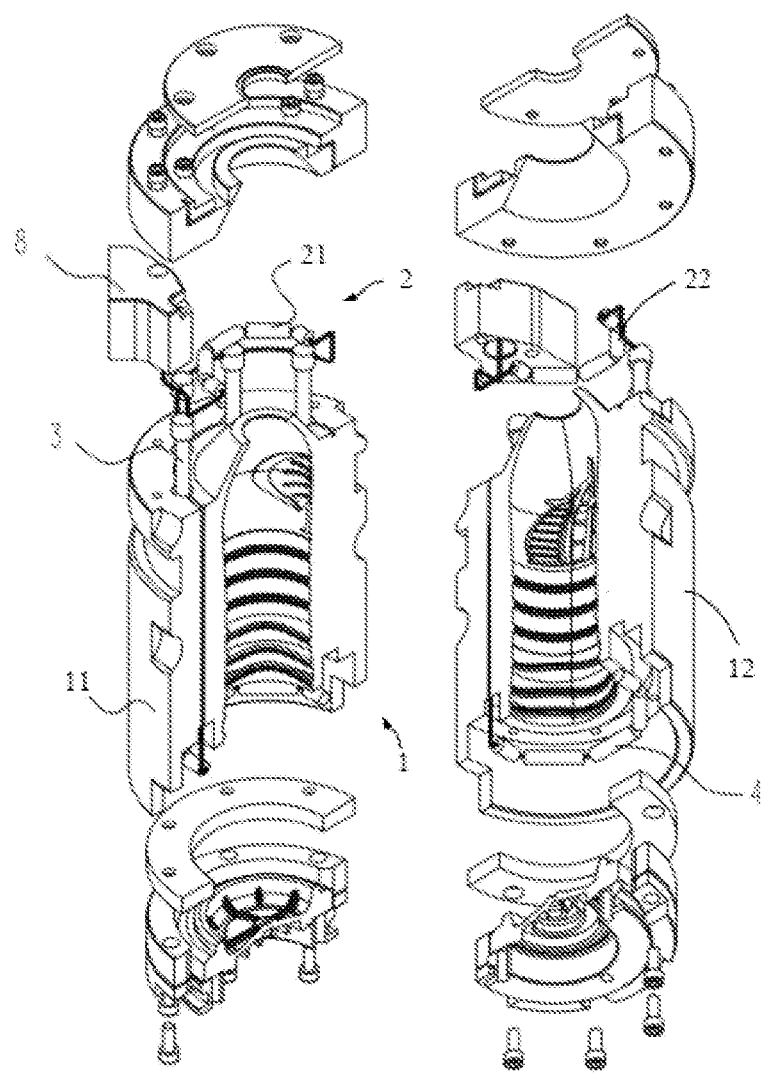
FIG. 2 is an exploded structure view according to the present disclosure.
Figure 3:
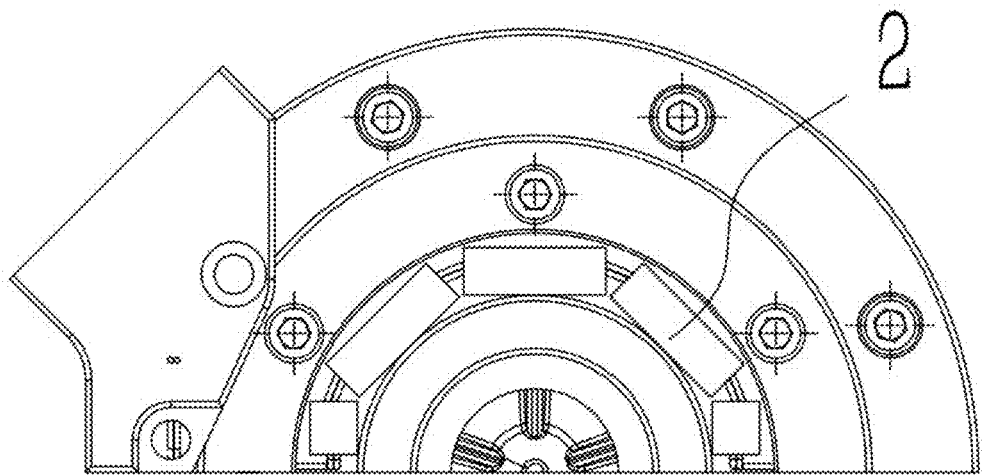
FIG. 3 is a view in a direction A of FIG. 1 (a flange of a bottleneck is removed)
Figure 4:
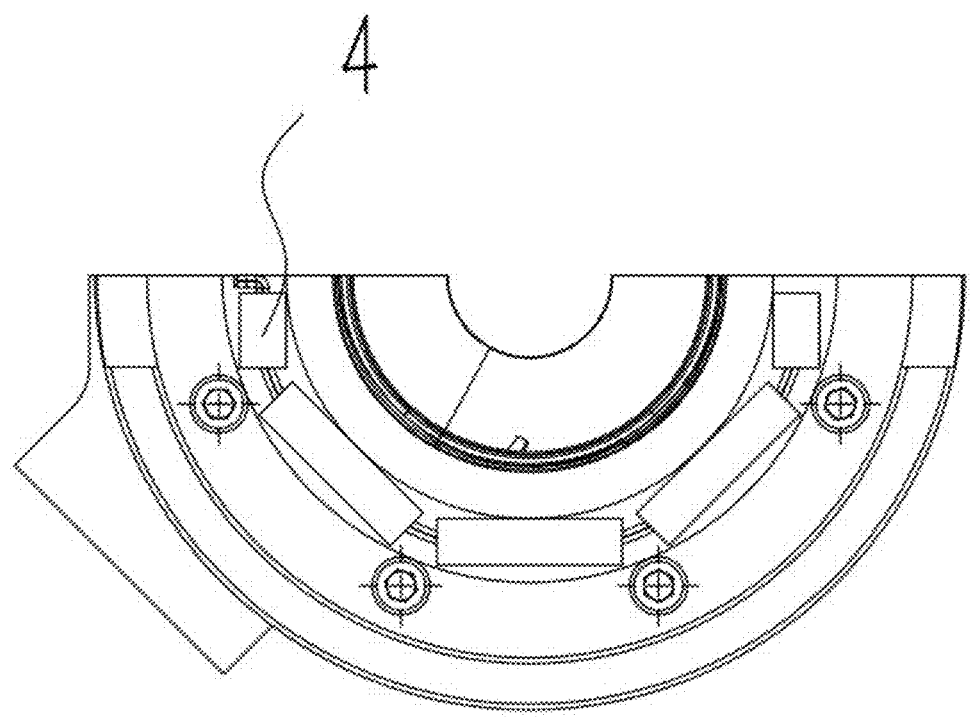
FIG. 4 is a view in a direction B of FIG. 1 (a bottom mold, a bottom mold card board, a thickness plate, and a lower cover plate are removed)
Figure 5:
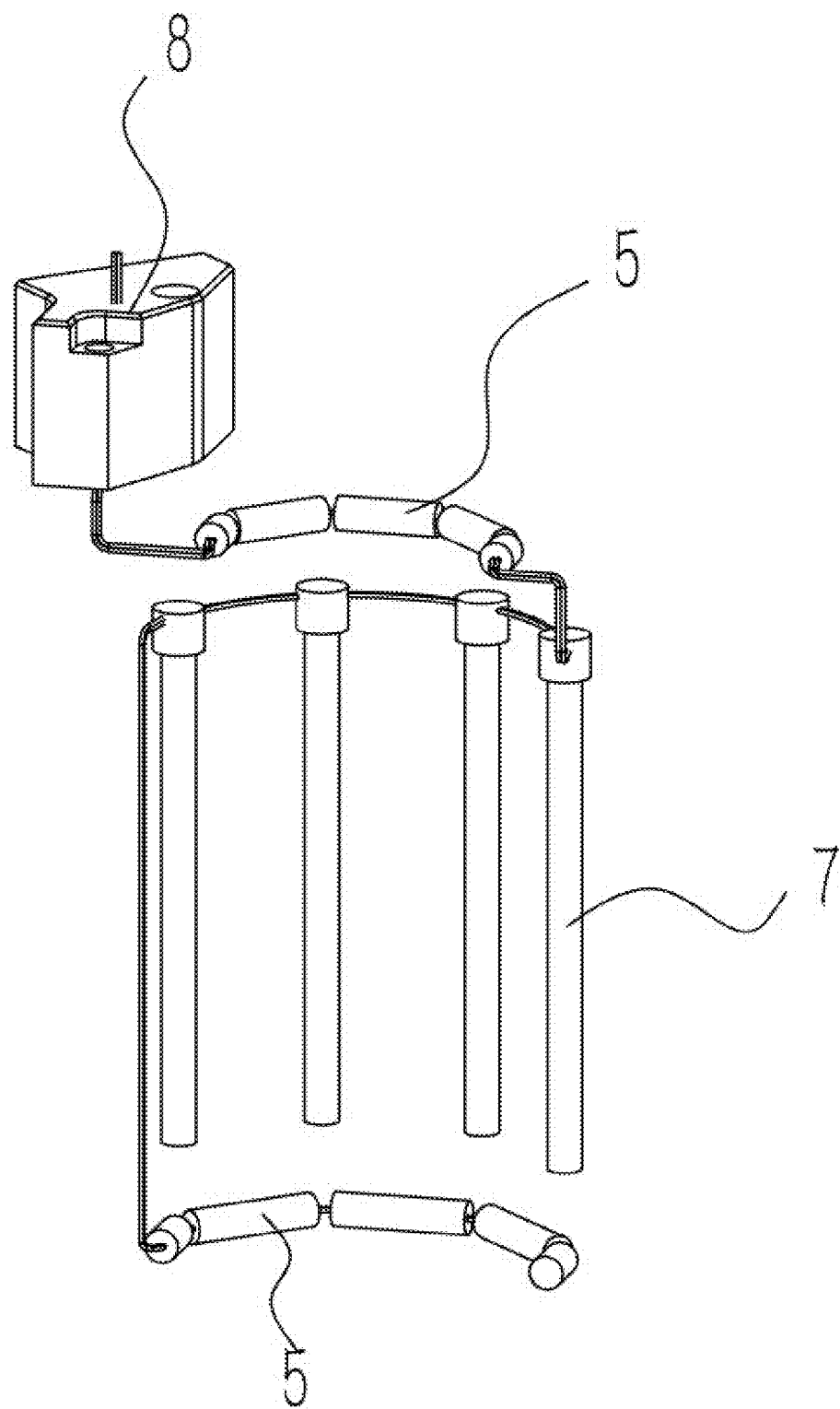
FIGS. 5 and 6 are schematic views of an electrical heating device.
Figure 6:
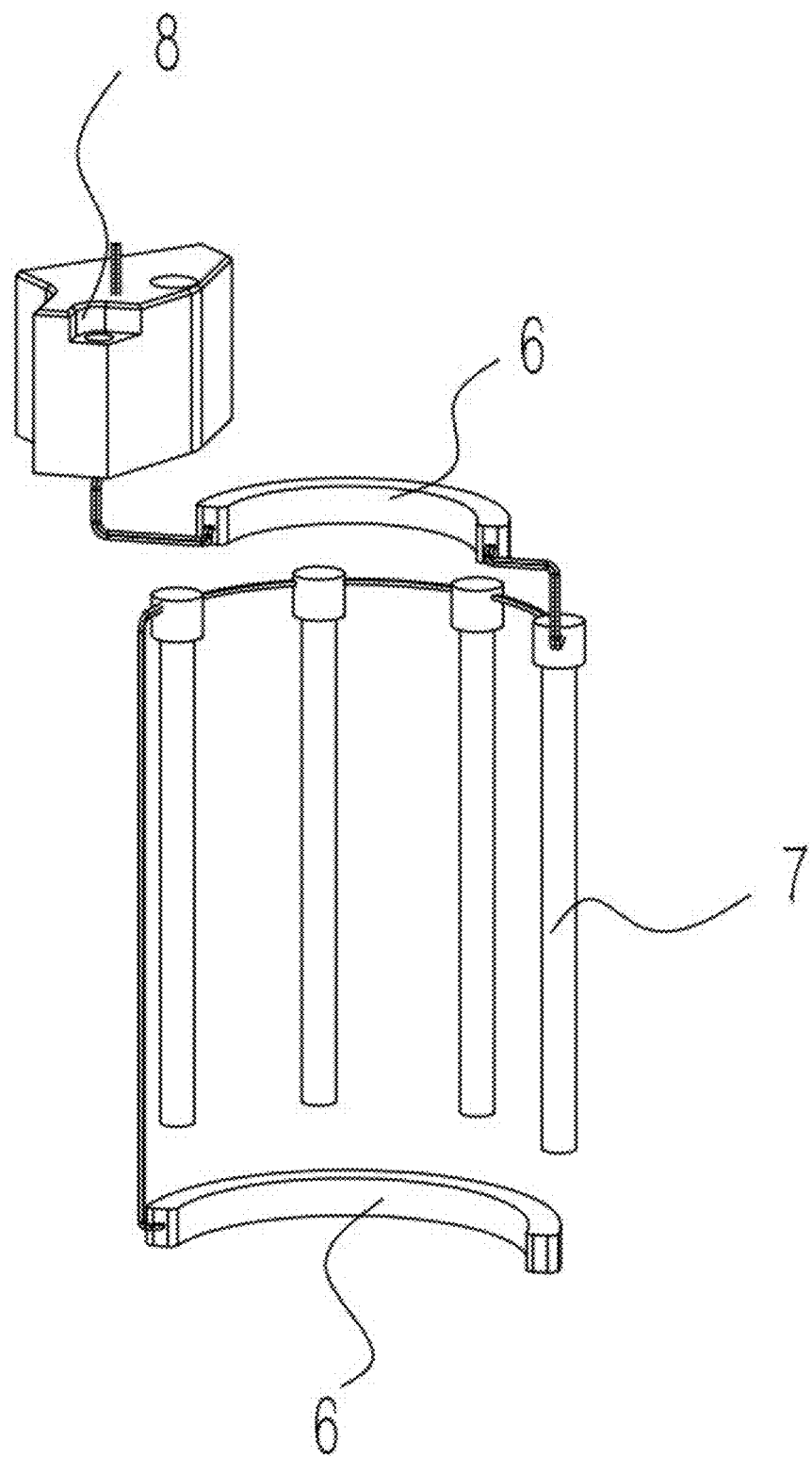
Figure 7:
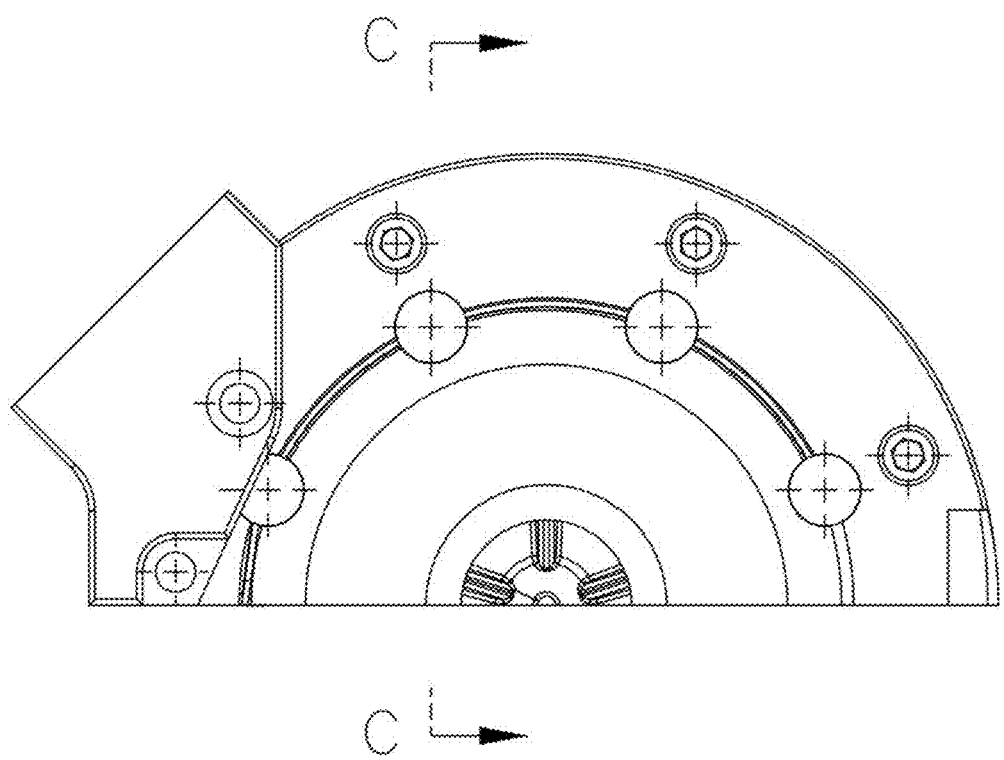
FIG. 7 is a top view of FIG. 1.
Figure 8:
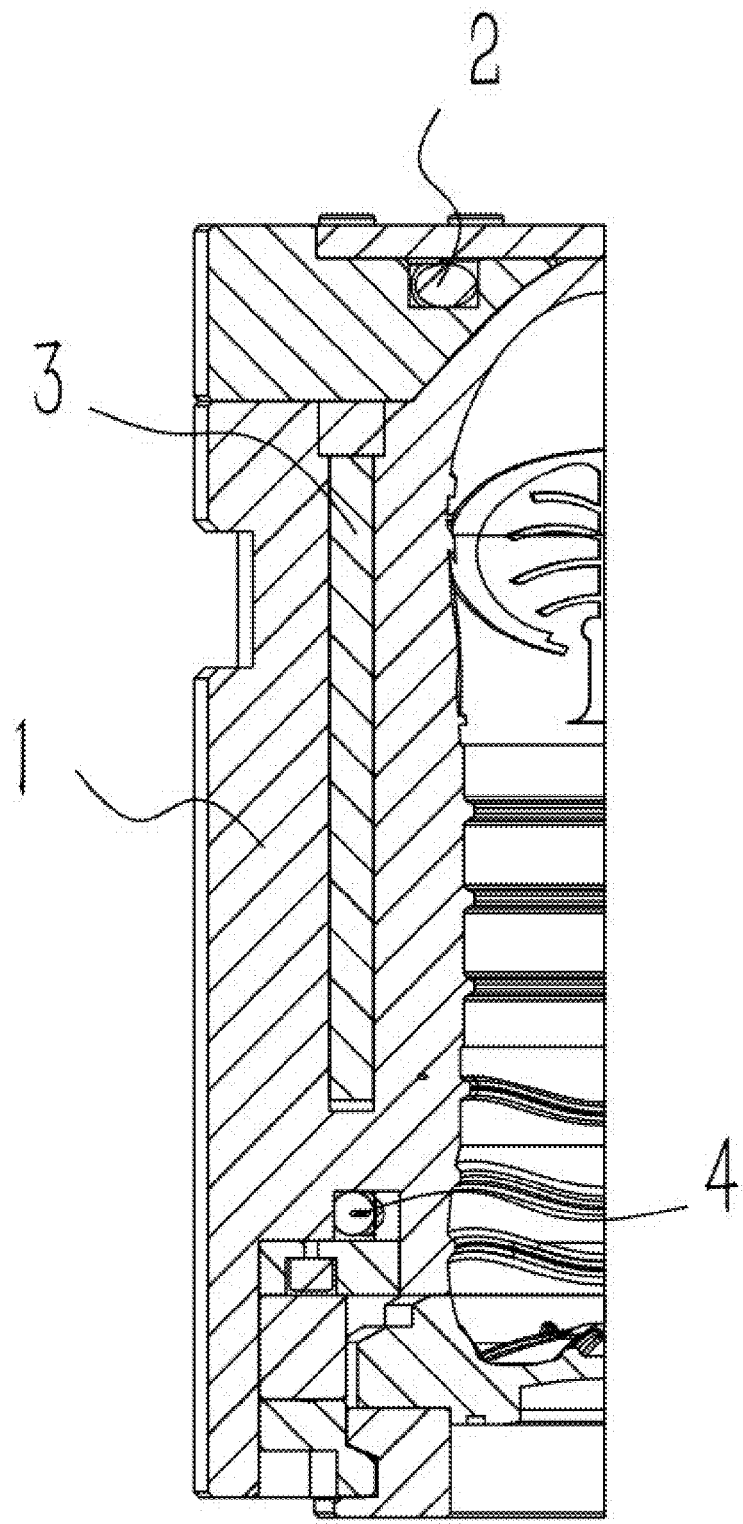
FIG. 8 is a cross-sectional view take along a line C-C of FIG. 7.

As shown in FIGS. 1 to 8, an electrical heating mold includes a mold casing 1 and an electrical heating device disposed in the mold casing 1. The electrical heating device includes an upper annular heating resistor element group 2 configured to perform heating around a bottleneck, a middle annular vertical-inserted columnar heating resistor element group 3 configured to perform heating around a bottle body, and a lower annular heating resistor element group 4 configured to perform heating around a bottle bottom.

The mold casing includes a left mold casing 11 and a right mold casing 12. The upper annular heating resistor element group 2 includes a left semi-annular upper heating resistor element group 21 and a right semi-annular upper heating resistor element group 22 which are disposed on the left mold casing 11 and the right mold casing 12, respectively. The middle annular vertical-inserted columnar heating resistor element group 3 includes a left semi-annular middle vertical-inserted columnar heating resistor element group and a right semi-annular middle vertical-inserted columnar heating resistor element group which are disposed on the left mold casing 11 and the right mold casing 12, respectively. The lower annular heating resistor element group 4 includes a left semi-annular lower heating resistor element group and a right semi-annular lower heating resistor element group which are disposed on the left mold casing 11 and the right mold casing 12, respectively.

An upper end surface of the left mold casing 11 and an upper end surface of the right mold casing 12 are provided with a left upper cover plate and a right upper cover plate, respectively, and the left semi-annular upper heating resistor element group 21 and the right semi-annular upper heating resistor element group 22 are disposed on the left upper cover plate and the right upper cover plate, respectively. The left semi-annular lower heating resistor element group and the right semi-annular lower heating resistor element group are disposed on a lower end surface of the left mold casing 11 and a lower end surface of the right mold casing 12, respectively. The left semi-annular middle vertical-inserted columnar heating resistor element group and the right semi-annular middle vertical-inserted columnar heating resistor element group are inserted into the left mold casing 11 from the upper end surface of the left mold casing 11 and the right mold casing 12 from the upper end surface of the right mold casing 12, respectively.

The left semi-annular upper heating resistor element group 21, the left semi-annular middle vertical-inserted columnar heating resistor element group, and the left semi-annular lower heating resistor element group are connected in series through a first wire. The right semi-annular upper heating resistor element group 22, the right semi-annular middle vertical-inserted columnar heating resistor element group, and the right semi-annular lower heating resistor element group are connected in series through a second wire. Both the first wire and the second wire extend into a junction box 8, and the junction box 8 is disposed on the left upper cover plate or the right upper cover plate.

The left semi-annular upper heating resistor element group 21, the right semi-annular upper heating resistor element group 22, the left semi-annular lower heating resistor element group, and the right semi-annular lower heating resistor element group each are formed by a plurality of horizontally arranged columnar heating rods 5 which are connected with each other and distributed at intervals in a semi-annular arrangement. Alternatively, the left semi-annular upper heating resistor element group 21, the right semi-annular upper heating resistor element group 22, the left semi-annular lower heating resistor element group, and the right semi-annular lower heating resistor element group each are formed by an electrical heating sheet 6 bending in a semi-annular shape. The left semi-annular middle vertical-inserted columnar heating resistor element group and the right semi-annular middle vertical-inserted columnar heating resistor element group each include a plurality of vertically arranged heating rods 7 which are distributed at intervals in a semi-annular arrangement, and top ends of all the heating rods 7 are connected in series. Materials or resistance values of the upper annular heating resistor element group, the middle annular vertical-inserted columnar heating resistor element group, and the lower annular heating resistor element group may be the same or different.

What is claimed is:

1. An electrical heating mold, comprising: a mold casing and an electrical heating device disposed in the mold casing, wherein the electrical heating device comprises an upper annular heating resistor element group configured to perform heating around a bottleneck, a middle annular vertical-inserted columnar heating resistor element group configured to perform heating around a bottle body, and a lower annular heating resistor element group configured to perform heating around a bottle bottom;

wherein the mold casing comprises a left mold casing and a right mold casing;

the upper annular heating resistor element group comprises a left semi-annular upper heating resistor element group and a right semi-annular upper heating resistor element group which are disposed on the left mold casing and the right mold casing, respectively;

the middle annular vertical-inserted columnar heating resistor element group comprises a left semi-annular middle vertical-inserted columnar heating resistor element group and a right semi-annular middle vertical-inserted columnar heating resistor element group which are disposed on the left mold casing and the right mold casing, respectively; and the lower annular heating resistor element group comprises a left semi-annular lower heating resistor element group and a right semi-annular lower heating resistor element group which are disposed on the left mold casing and the right mold casing, respectively;

wherein an upper end surface of the left mold casing and an upper end surface of the right mold casing are provided with a left upper cover plate and a right upper cover plate, respectively;

the left semi-annular upper heating resistor element group and the right semi-annular upper heating resistor element group are disposed on the left upper cover plate and the right upper cover plate, respectively;

the left semi-annular lower heating resistor element group and the right semi-annular lower heating resistor element group are disposed on a lower end surface of the left mold casing and a lower end surface of the right mold casing, respectively; and the left semi-annular middle vertical-inserted columnar heating resistor element group and the right semi-annular middle vertical-inserted columnar heating resistor element group are inserted into the left mold casing from the upper end surface of the left mold casing and the right mold casing from the upper end surface of the right mold casing, respectively.

2. The electrical heating mold of claim 1, wherein the left semi-annular upper heating resistor element group, the left semi-annular middle vertical-inserted columnar heating resistor element group, and the left semi-annular lower heating resistor element group are connected in series through a first wire;

the right semi-annular upper heating resistor element group, the right semi-annular middle vertical-inserted columnar heating resistor element group, and the right semi-annular lower heating resistor element group are connected in series through a second wire; and both the first wire and the second wire extend into a junction box, and the junction box is disposed on the left upper cover plate or the right upper cover plate.

3. The electrical heating mold of claim 1, wherein the left semi-annular upper heating resistor element group, the right semi-annular upper heating resistor element group, the left semi-annular lower heating resistor element group, and the right semi-annular lower heating resistor element group each are formed by a plurality of horizontally arranged columnar heating rods which are connected with each other and distributed at intervals in a semi-annular arrangement, or, the left semi-annular upper heating resistor element group, the right semi-annular upper heating resistor element group, the left semi-annular lower heating resistor element group, and the right semi-annular lower heating resistor element group each are formed by an electrical heating sheet bending in a semi-annular shape; and the left semi-annular middle vertical-inserted columnar heating resistor element group and the right semi-annular middle vertical-inserted columnar heating resistor element group each comprise a plurality of vertically arranged heating rods which are distributed at intervals in a semi-annular arrangement, and top ends of all the plurality of heating rods are connected in series.

4. The electrical heating mold of claim 2, wherein the left semi-annular upper heating resistor element group, the right semi-annular upper heating resistor element group, the left semi-annular lower heating resistor element group, and the right semi-annular lower heating resistor element group each are formed by a plurality of horizontally arranged columnar heating rods which are connected with each other and distributed at intervals in a semi-annular arrangement, or, the left semi-annular upper heating resistor element group, the right semi-annular upper heating resistor element group, the left semi-annular lower heating resistor element group, and the right semi-annular lower heating resistor element group each are formed by an electrical heating sheet bending in a semi-annular shape; and the left semi-annular middle vertical-inserted columnar heating resistor element group and the right semi-annular middle vertical-inserted columnar heating resistor element group each comprise a plurality of vertically arranged heating rods which are distributed at intervals in a semi-annular arrangement, and top ends of all the plurality of heating rods are connected in series.

\* \* \* \* \*